(12) United States Patent  
Kim

(10) Patent No.: US 6,630,686 B1
(45) Date of Patent: Oct. 7, 2003

(54) LIQUID CRYSTAL DISPLAY HAVING PAD PARTS AND METHOD FOR MANUFACTURING SAME

(75) Inventor: Jong-Woo Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/205,582

(22) Filed: Dec. 4, 1998

(30) Foreign Application Priority Data

Jun. 30, 1998 (KR) .............................................. 98-25443

(51) Int. Cl.[7] .............................................. H01L 29/04
(52) U.S. Cl. .......................... 257/72; 257/59; 257/783; 349/58; 349/149; 349/150; 349/151; 349/152
(58) Field of Search ........................... 257/59, 72, 783, 257/668; 349/58, 150, 149, 783, 151, 152

(56) References Cited

U.S. PATENT DOCUMENTS

| 5,187,604 A | | 2/1993 | Taniguchi et al. | |
|---|---|---|---|---|
| 5,345,039 A | * | 9/1994 | Yamazaki | 174/52.4 |
| 5,510,918 A | * | 4/1996 | Matsunaga et al. | 359/88 |
| 5,523,866 A | * | 6/1996 | Morimoto et al. | 257/59 |
| 5,541,748 A | * | 7/1996 | Ono et al. | 359/59 |
| 5,572,346 A | | 11/1996 | Sakamoto et al. | 359/88 |
| 5,726,491 A | * | 3/1998 | Tajima et al. | 257/668 |
| 6,016,174 A | * | 1/2000 | Endo et al. | 349/43 |
| 6,031,590 A | * | 2/2000 | Kim | 349/86 |
| 6,078,366 A | * | 6/2000 | Dohjo et al. | 349/43 |

FOREIGN PATENT DOCUMENTS

| GB | 2090036 | | 6/1982 | |
|---|---|---|---|---|
| GB | 2 090 036 A | | 6/1982 | |
| JP | 405265024 | * | 10/1993 | 349/149 |

* cited by examiner

Primary Examiner—Eddie Lee
Assistant Examiner—Eugene Lee
(74) Attorney, Agent, or Firm—McKenna Long & Aldridge LLP

(57) ABSTRACT

A flat panel display, such as an LCD, has a substrate for fabricating thereon pixel electrodes and data and gate lines which are connected to pad terminals to communicate electronic signals to and from the display panel. To enhance the contact between the pad terminals to outer devices, such as display drivers, a plurality of holes are created near the pad terminals of the display panel to adhere the tape carrier package (TCP) to the substrate of the display panel. The TCP securely attached to the substrate prevents the passivation layer of the pixel electrodes from being disturbed from its original configuration or peeled off from the substrate.

21 Claims, 7 Drawing Sheets

LIQUID CRYSTAL DISPLAY HAVING PAD PARTS AND METHOD FOR MANUFACTURING SAME

BACKGROUND OF THE INVENTION

1. Field of the Invention

The present invention relates to a method for manufacturing a liquid crystal display (LCD) device, and in particular, the present invention relates to a method for an LCD in which the pad terminal communicating an electric signal to an outer device and the terminal of the outer device cohere well with each other, and to the structure of an LCD having the same pad terminal.

2. Description of Related Art

The cathode ray tube (CRT), the most widely used display device, is being replaced by the thin flat display device because the flat display device is thinner and lighter than the CRT so it can be applied to any place. Active research activities have focused on the development of liquid crystal display devices because of their high resolution and fast response time suitable for displaying motion picture images. Furthermore, the active panel comprising an active switching element such as a thin film transistor (or TFT) is more popularly applied to the LCD.

A liquid crystal display device works by using polarization and optical anisotropy of a liquid crystal. By controlling the orientation of liquid crystal molecules having rod shape through polarization technique, transmission and interception of a light through the liquid crystal are achieved due to the anisotropy of the liquid crystal. This principle is applied to the liquid crystal display device. Active matrix LCDs (AMLCDs) having TFTs arranged in a matrix pattern and pixel electrodes connected to the TFTs provide high quality images and are now widely used.

The structure of a conventional AMLCD will now be described. FIG. 1 shows a perspective view of the AMLCD and FIG. 2 shows the cross-sectional view of FIG. 1 along the cutting line II—II. The conventional AMLCD comprises an upper panel 3 and a lower panel 5 which are joined to each other with a liquid crystal material 10 injected therebetween. The upper panel 3 has a color filter panel which includes a sequential arrangement of red(R), green(G) and blue(B) color filters 7 on a first transparent substrate 1a at pixel positions designed in a matrix pattern. Among these color filters 7, black matrixes 9 are formed in a lattice pattern. The black matrixes 9 prevent the colors from mixing at the boundary area. On the color filters 7, a common electrode 8 is formed. The common electrode 8 is one electrode of the two electrodes generating an electric field applied to the liquid crystal layer.

The lower panel 5 of the LCD comprises switching elements and bus lines generating the electric field for driving the liquid crystal layer. This panel is called an active panel. The active panel 5 of an AMLCD includes pixel electrodes 41 designed in a matrix pattern and formed on a second transparent substrate 1b. Along the column direction of the pixel electrodes 41, signal bus lines 13 are formed, and along the row direction of the pixel electrodes 41, data bus lines 23 are formed. At a corner of a pixel electrode 41, a TFT 19 for driving the pixel electrode 41 is formed. A gate electrode 11 of the TFT 19 is connected with the signal bus line 13 (or the gate line). A source electrode 21 of the TFT 19 is connected with the data line 23 (or the source line). A semiconductor layer 33 is formed between the source electrode 21 and the drain electrode 31. An ohmic contact exists between the source electrode 21 and the semiconductor layer 33 and between the drain electrode 31 and the semiconductor layer 33 are also ohmic contacted. A gate pad 15 and a source pad 67, the terminals of the bus lines, are formed at the end portion of the gate line 13 and the source line 23, respectively. Additionally, a gate pad terminal 57 and a source pad terminal 25 are formed on the gate pad 15 and the source pad 67, respectively.

As the signal voltage applied to the gate pad 15 is applied to the gate electrode 11 via the gate line 13, the TFT 19 of the corresponding gate electrode 11 transitions to the ON state. Then the source electrode 21 and the drain electrode 31 of the TFT 19 are electrically connected so that the electrical picture data applied to the source pad 25 is sent to the drain electrode 31 through the source line 23 and the source electrode 21. Therefore, by controlling the signal voltage to the gate electrode 11, the transfer of picture data to the drain electrode is controlled. That is, the TFT 19 acts as a switching element. A gate insulating layer 17 is inserted between the layer including the gate electrode 11 and the layer including the source electrode 23 to electrically isolate them. A passivation layer 37 is formed on the layer including the source line 23 to protect all elements of the transistor.

The color filter panel 3 and the active panel 5 are bonded together to face each other with a certain separation distance therebetween (i.e., a cell gap). Liquid crystal material 10 fills the cell gap and the edge of the bonded panels is sealed with a sealant 81 such as an epoxy to prevent the liquid crystal from leaking out so that a liquid crystal panel of an AMLCD is completed.

The AMLCD is finally made by assembling the liquid crystal panel with peripheral devices for the screen data. At this time, the pads of the liquid crystal panel and the terminal of the peripheral devices are generally electrically connected with a tape carrier package (TCP) using an anisotropic conductive film (ACF). FIG. 3 shows a general structure of the ACF. FIGS. 4a and 4b illustrate the conventional method for connecting the TCP to the pad using the ACF and illustrate the structure of the pad.

As shown in FIG. 3, the ACF 71 comprises a plurality of conductive ball 95 coated with an insulation membrane 93 in an isotropic film 31. On the pad terminals 47 connected to the pads 45 (for example, the gate pads 15 or the source pad 67) at the edge of the liquid crystal panel, an ACF 71 is attached and TCP 73 is sequentially attached thereon. At this time, the conductive pad 75 of the TCP 73 should be aligned with the pad 45 (for example, the gate pads 15 or the source pad 67) of the liquid crystal panel, as shown in FIG. 4a. The TCP 73 is pressed and heated while the conductive balls 95 are inserted between the TCP pad 75 and the pad terminal 47 of the liquid crystal panel. When sufficient pressure is applied against the TCP 73, the insulation membrane 93 covering the conductive ball 95 are broken so that each TCP pad 75 becomes electrically connected to each pad terminal 47 of the liquid crystal panel, as shown in FIG. 4b. Even if there are some conductive balls 95 between the neighbored-pad terminals 47, the neighbored pad terminals 47 are electrically isolated from each other because the conductive balls 95 are covered by the insulation membrane 93.

In the step of attaching the TCP to the pad terminal as mentioned above, the film portion 77 between each pad portion 73 are expanded somewhat by heat and pressure and cohered to the passivation layer 37 formed on the top of the liquid crystal panel. As shown in FIG. 5, after removing the pressure and the heat, the expanded film portion of the TCP is shrunk which results in the pulling force 83 so that the passivation layer 37 being cohered with the film portion 77 is peeled off.

Generally, after the liquid crystal panel is completed, the edge portion of the panel having the shorting bar used for protecting the electrostatic need to be trimmed off. At that time, the trimming force, which is applied to the trimmed edge, can cause the passivation layer 37 or the gate insulating layer 17 to be structurally unstable. At this portion, the passivation layer 37 can be easily peeled off, when the heating energy is removed after the film portion 77 of the TCP is cohered with the passivation layer 37 with the ACF 71 therebetween. This comes from the peeling force 89 made of the vector summation of the horizontal shrinking force 87 of the ACF 71 and the vertical shrinking force 85 of the ACF 71 and TCP 73, as shown in FIG. 6.

SUMMARY OF THE INVENTION

It is an object of the present invention to suggest a method for manufacturing the LCD panel with enhanced structural integrity of the LCD panel in which the coherence of the TCP and the LCD panel is enhanced when the TCP is attached to the pad terminals of the LCD for electrically connecting them.

Another object is to suggest a method for manufacturing the LCD panel in which the ACF inserted between the TCP and the pad terminal is directly cohered with some portion of the substrate of the LCD panel.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to accomplish these objects, the present invention suggests a method for manufacturing an LCD panel comprising steps of forming a thin film transistor having a gate electrode, a source electrode and a drain electrode, a gate line connecting the gate electrode, a source line connecting the source electrode and, a gate pad and a source pad formed at the end of the gate line and the source line, respectively on a substrate, depositing a passivation layer covering the thin film transistor and the pads and, exposing some portions of the gate pad, the source pad and some portion of the substrate between the each pad. Also, an LCD panel according to the present invention comprises a substrate, a plurality of gate line on the substrate, a plurality of data line crossing with the gate line, a gate pad and a data pad at the ends of the each gate line and the source line, respectively, and a plurality of hole exposing some portions of the substrate between the each pad.

These and other aspects, features and advantages of the present invention will be better understood by studying the detailed description in conjunction with the drawings and the accompanying claims.

BRIEF DESCRIPTION OF THE ATTACHED DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
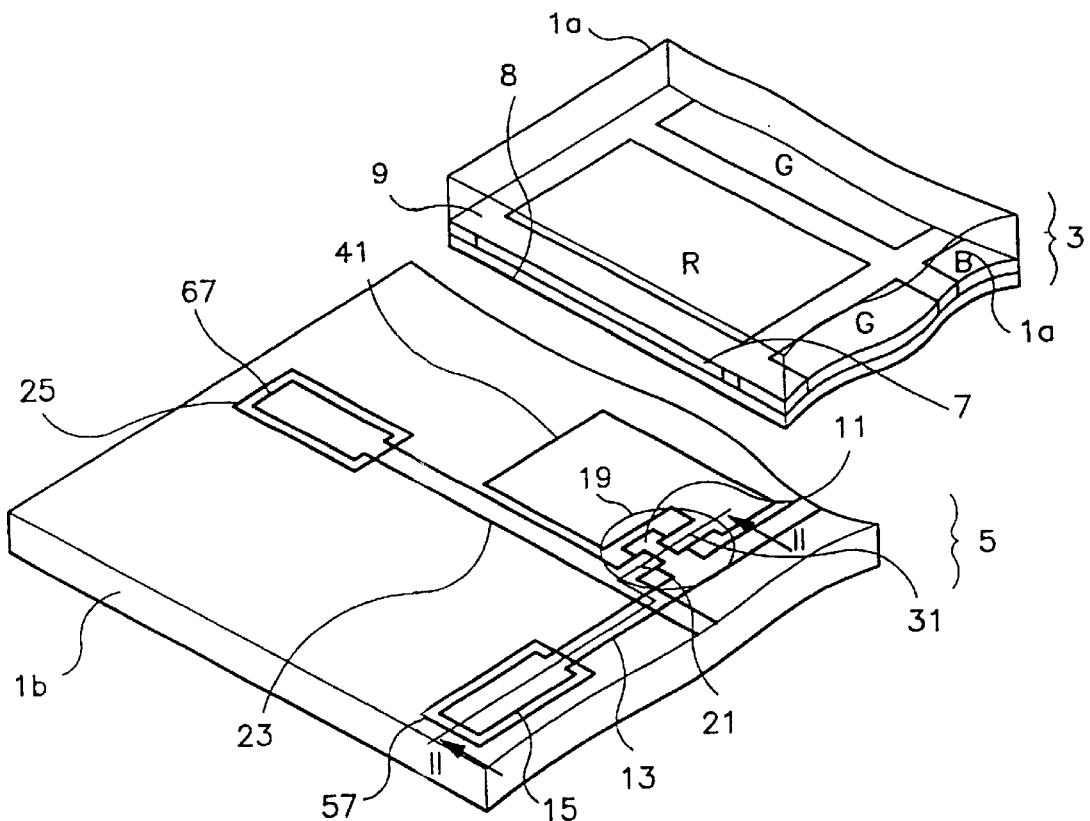
FIG. 1 is a perspective view of a conventional active matrix liquid crystal display device.
Figure 2:
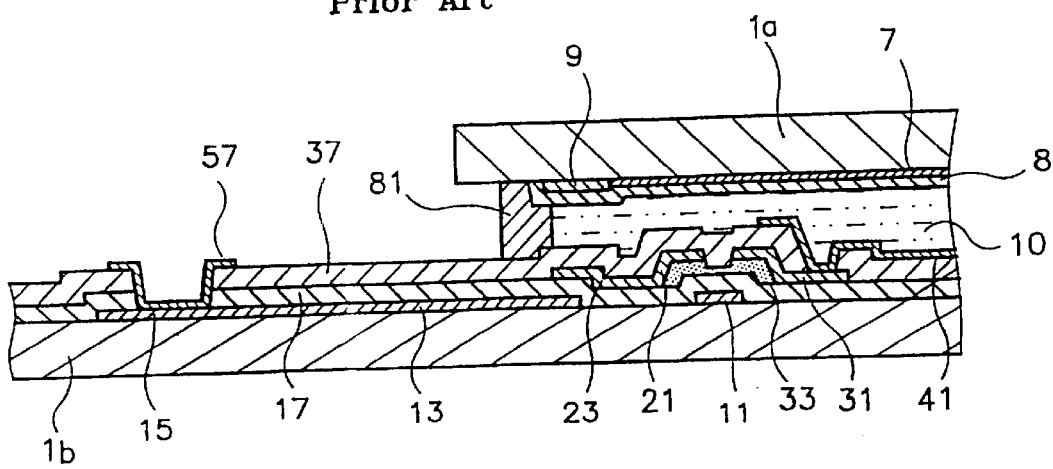
FIG. 2 is a cross-sectional view of the conventional active matrix liquid crystal display device.
Figure 3:
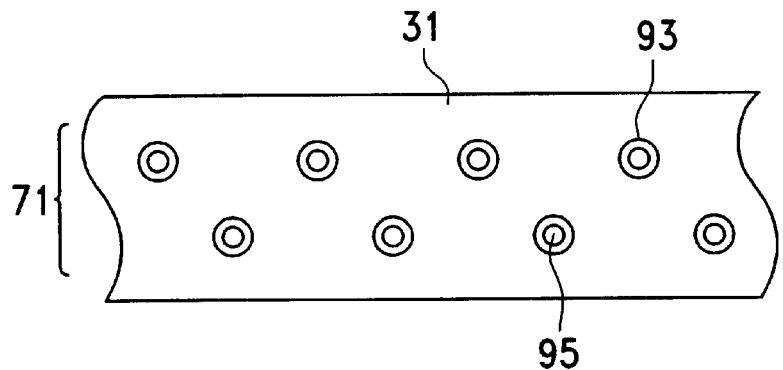
FIG. 3 is a cross-sectional view of the structure of ACF.
Figure 4A:
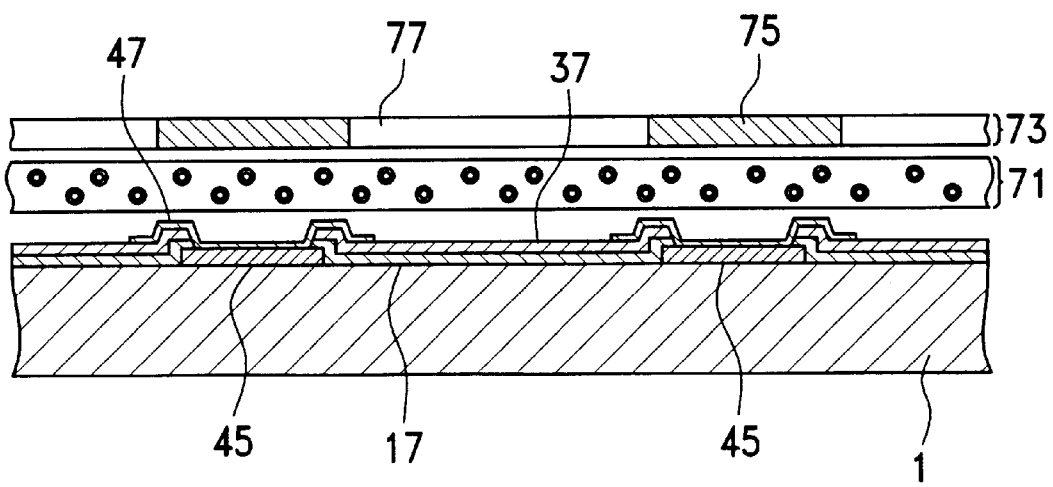
FIGS. 4a and 4b are cross-sectional views showing the TCP being connected to the LCD pad using an ACF.
Figure 4B:
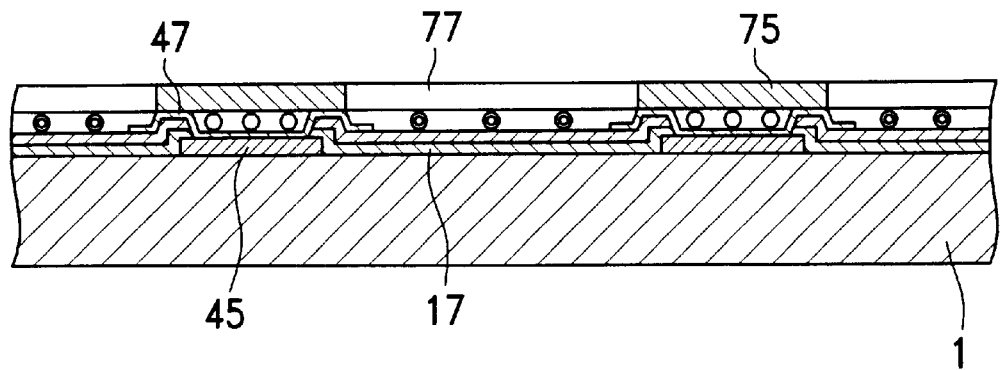
Figure 5:
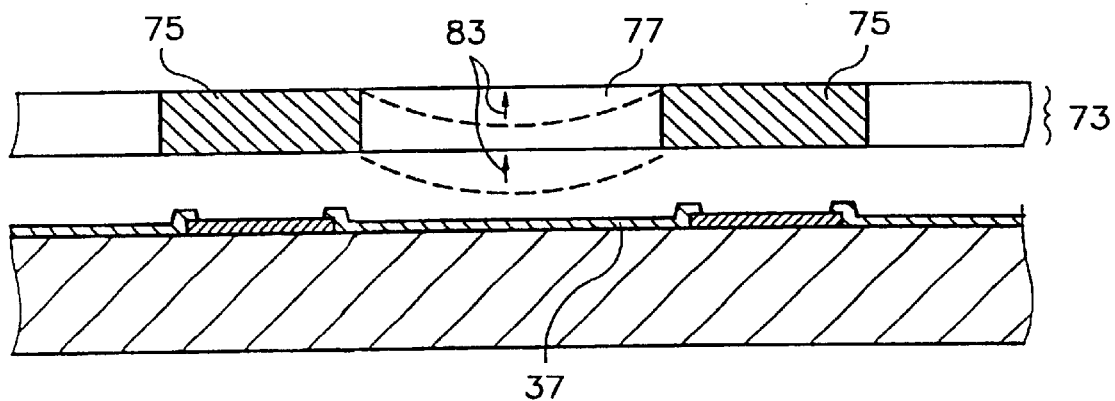
FIG. 5 is a cross-sectional view of the passivation layer of the LCD panel is being peeled off according to the shrinking force of the film.
Figure 6:
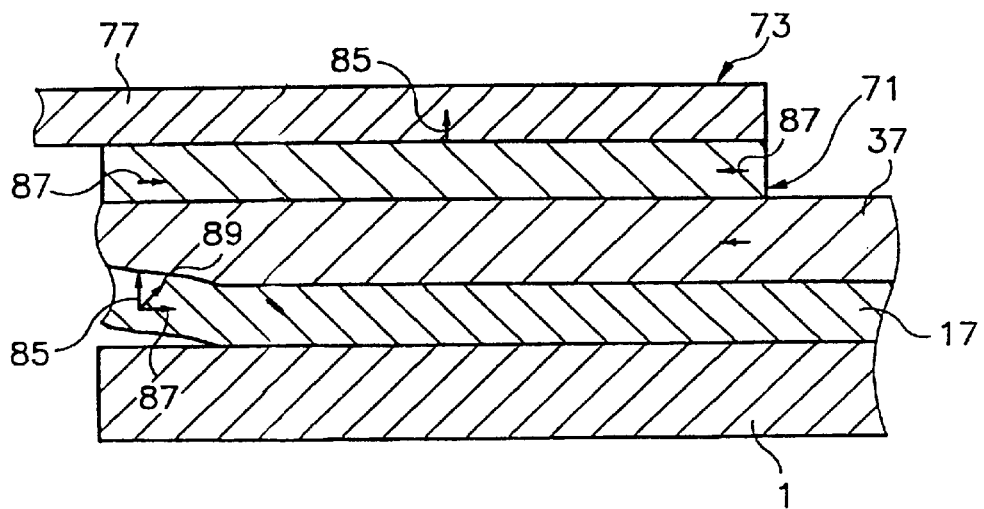
FIG. 6 is a cross-sectional view of the passivation layer at the edge portion of the LCD panel being peeled off according to the shrinking force of the film.
Figure 7:
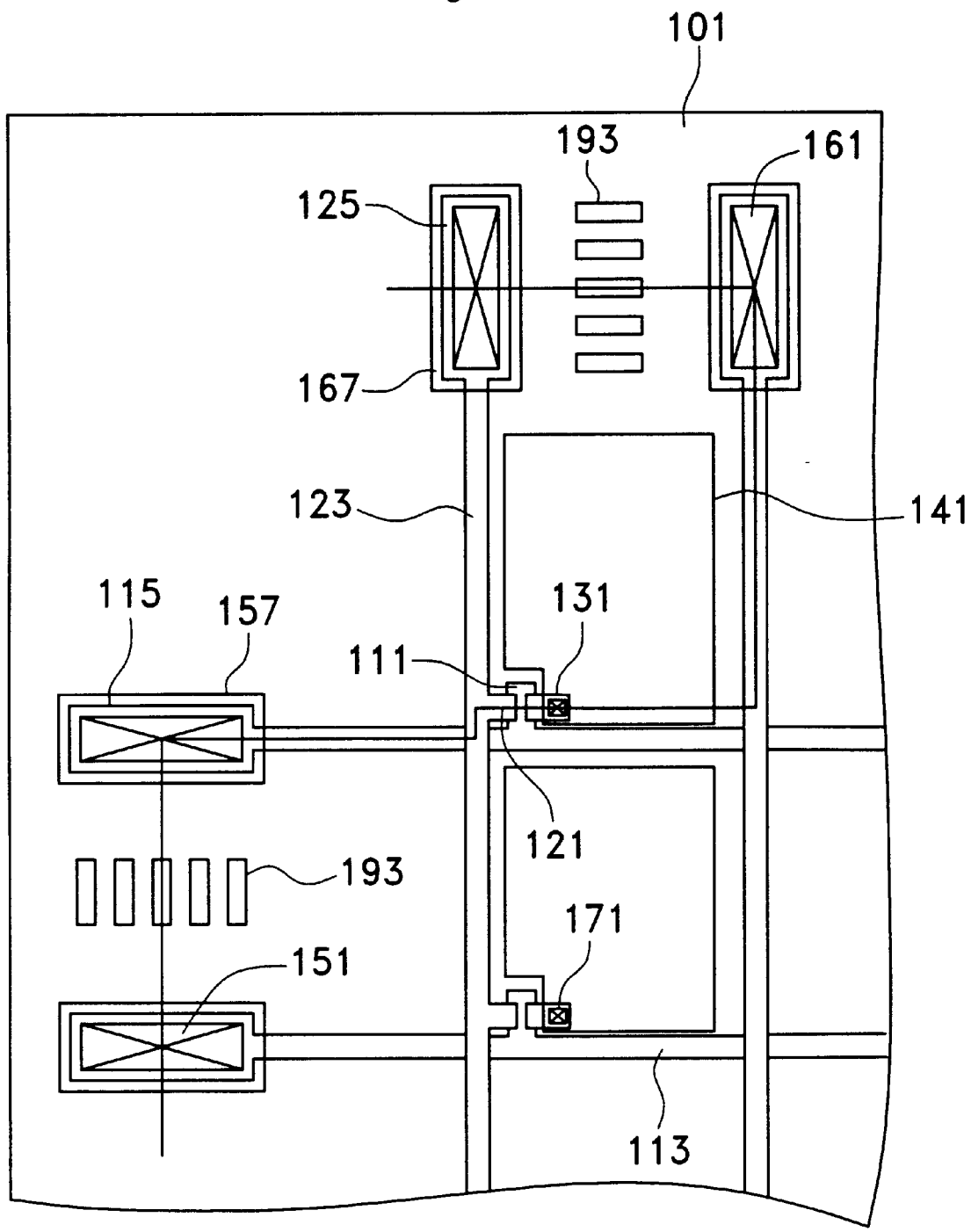
FIG. 7 is a plan view of an LCD panel according to the present invention.
Figure 8A:
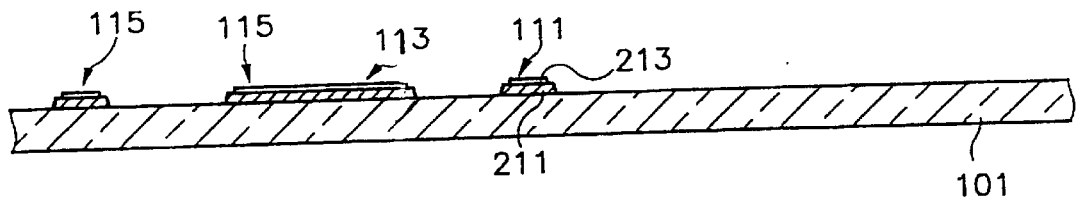
FIGS. 8a–8e are cross-sectional views showing a method for manufacturing the LCD panel according to the present invention.

FIG. 7 shows a plan view of an active panel according to a preferred embodiment of the present invention. On a transparent substrate 101, a first metal layer 211 is formed by depositing aluminum or aluminum alloy, as shown in FIG. 8a. A second metal layer 213 is formed by depositing a metal having a high melting point such as molybdenum, tantalum, tungsten or antimony sequentially on the first metal layer 211. These stacked metal layers 211 and 213 are patterned in a first mask process to form a gate electrode 111, a gate line 113 and a gate pad 115. Once these stacked layers 211 and 213 are patterned by a wet etching method, then the gate materials, such as the gate electrode, the gate line and the gate pad have a cross sectional shape where the width of the second metal layer 213 is narrower than that of the first metal layer 211. A plurality of the gate lines 113 is arrayed and fabricated in a vertical direction. The gate electrode 111 is derived from the gate line 113 and disposed at a corner of the designed pixel. The gate pad 115 is disposed at the end of the gate line 113, as shown in FIGS. 7 and 8a.

Figure 8B:
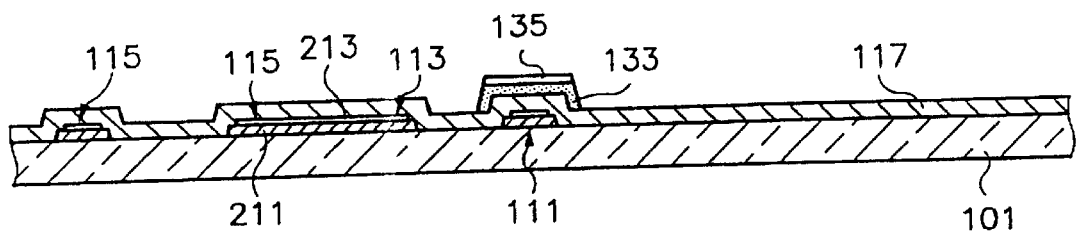

On the substrate having the gate material stacked with the first metal layer 211 and the second metal layer 213, an inorganic insulating material such as a silicon nitride or a silicon oxide or an organic insulating material such as BCB (bezocyclobutane) or acrylic resin is coated to form a gate 5 insulating layer 117. An intrinsic semiconductor material, such as a pure amorphous silicon, and an extrinsic semiconductor material, such as an impurity doped amorphous silicon, are sequentially deposited thereon. These stacked layers are patterned using a second mask process to form a semiconductor layer 133 and a doped semiconductor layer 135. They are disposed on the gate insulating layer over the gate electrode 111, as shown in FIGS. 7 and 8b.

Figure 8C:
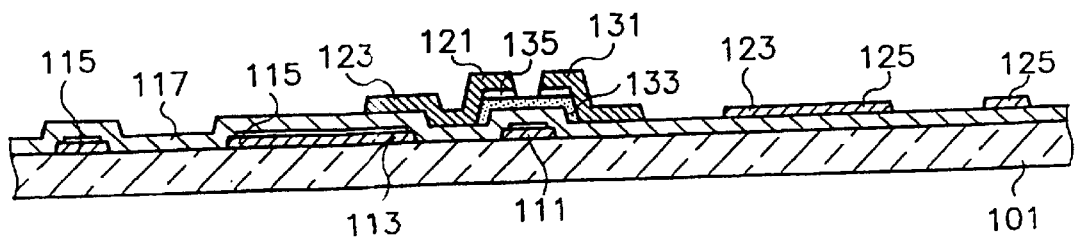

On the substrate 101 having the doped semiconductor layer 135, and the metal layer made of any suitable material, such as chromium or chromium alloy, are patterned using a third mask process to form a source electrode 121, a drain electrode 131, a source line 123 and a source pad 125. A plurality of the source lines 123 perpendicularly crossing each gate line 113 on the gate insulating layer 117 is arrayed in a horizontal direction. On one side of the doped semiconductor layer 135, the source electrode 121 derived from the source line 123 is formed. On the other side of the doped semiconductor layer 135, the drain electrode 131 facing the source electrode 121 is formed, as shown in FIGS. 7 and 8c.

Figure 8D:
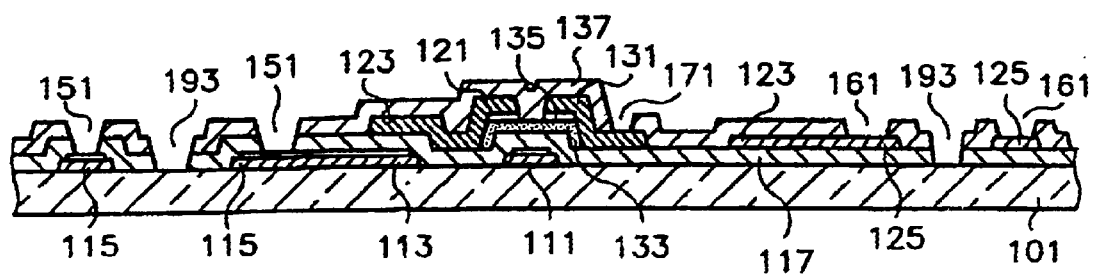

On the substrate 101 having the source materials (for example, the source electrode, the drain electrode, the source line and the source pad), an inorganic material such as silicon nitride or a silicon oxide is deposited or an organic material such as BCB(benzocyclobutene) or acrylic resin is coated to form a passivation layer 137. Using a fourth mask process, some portions of the passivation layer 137 covering the source pad 125 and the drain electrode 131 are removed to form a source contact hole 161 and a drain contact hole 171. And some portions of the passivation layer 137 and the gate insulating layer 117 covering the gate pad 115 are removed to form a gate contact hole 151. Some portion of the passivation layer 137 and the gate insulating layer 117 covering the substrate 101 between the each gate pad 115 and each source pad 125 are removed to form holes 193 exposing the substrate 101, as shown in FIGS. 7 and 8d.

Figure 8E:
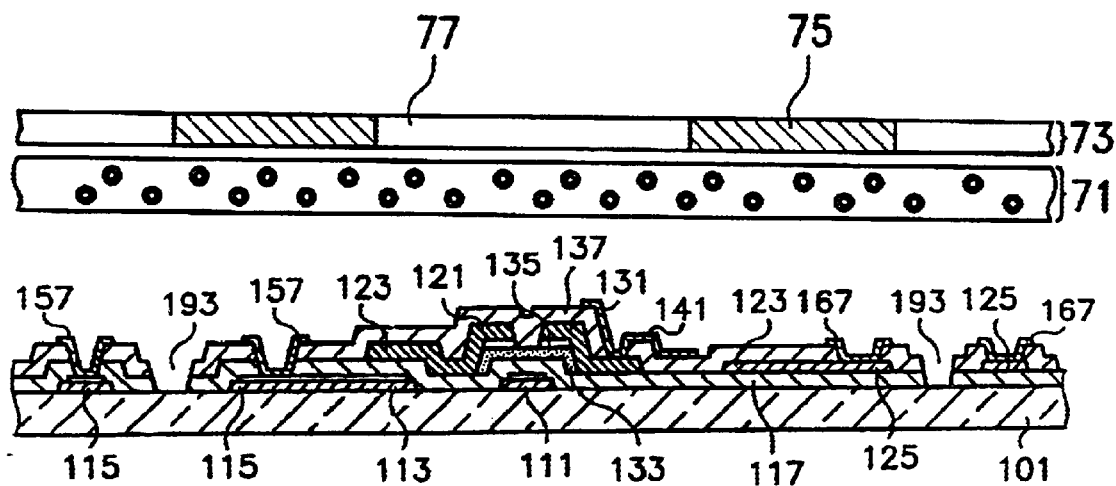

On the passivation layer 137, a transparent conductive material such as ITO (Indium Tin Oxide) is deposited and patterned using a fifth mask process to preferably form a pixel electrode 141, a gate pad terminal 157 and a source pad terminal 167. The pixel electrode 141 connects to the drain electrode 131 through the drain contact hole 171. The gate pad terminal 157 connects to the gate pad 115 through the gate contact hole 151. The source pad terminal 167 connects to the source pad 125 through the source contact hole 161, as shown in FIGS. 7 and 8e.

Figure 9:
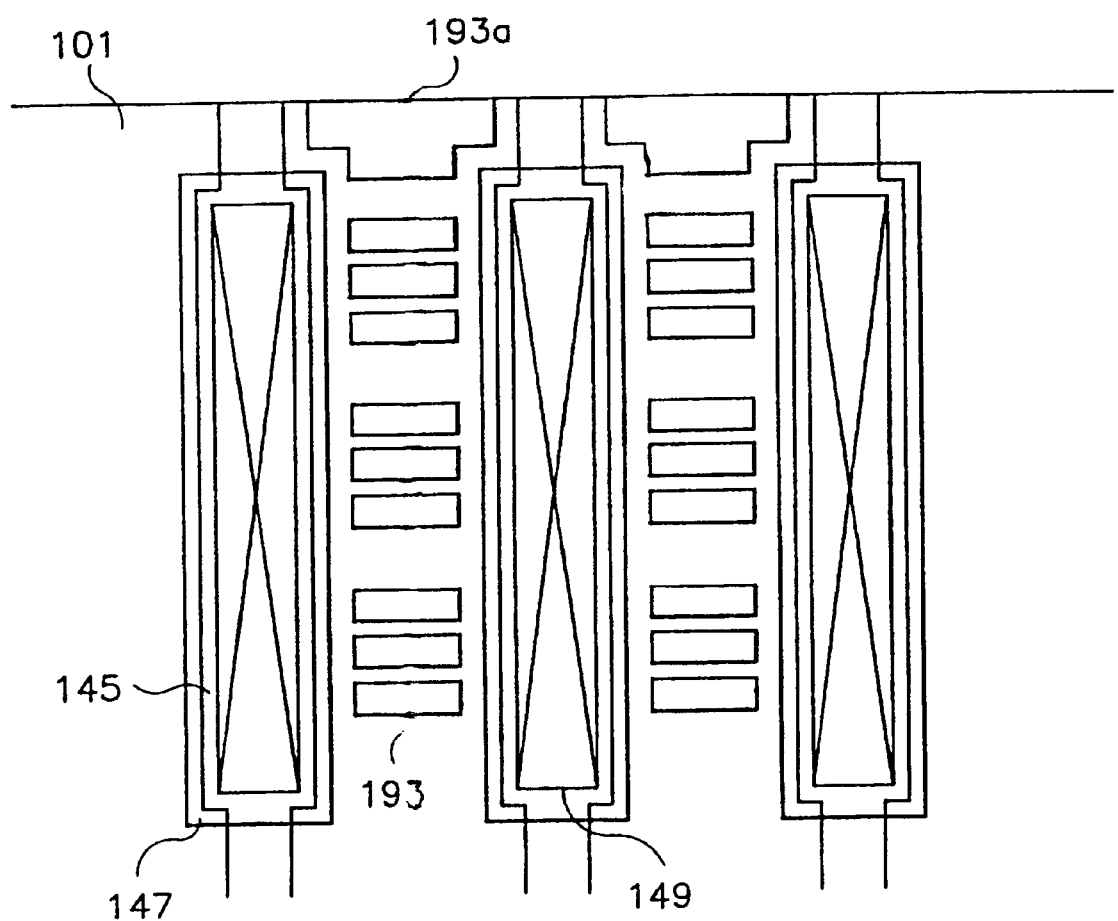
FIG. 9 is an enlarged plan view of the pad portion of the LCD panel according to the present invention.

FIG. 9 is a plan view illustrating the pad portion of the active panel according to the present invention. Some portions of the gate insulating layer 117 and the passivation layer 137 between the neighbored pad portions are removed to form the holes 193 exposing the substrate 101. It is preferable to form many small holes in order to enhance the adhesion effect of the TCP (similar to the prior art figures) to the pad according to the present invention, as shown in FIG. 9. It is especially preferable to form a large hole 193a at the edge portion because the gate insulating layer 117 and the passivation layer 137 have a weak cohering force at the edge portion.

According to the present invention, when the TCP is attached using ACF (similar to the prior art figures) on the pad terminal of the LCD panel, some portions of the ACF are directly attached to the substrate exposed through the holes so that the TCP and ACF are firmly cohered to the LCD panel. Therefore, it is possible to prevent the TCP and ACF from peeling off from the substrate.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A flat panel display device comprising:
  a substrate;
  a plurality of lines formed above the substrate, each line having a pad;
  a first layer positioned above the substrate to cover at least a portion of the substrate, wherein the first layer exposes the pad of the each line and defines at least one opening near the pad, the opening having a depth lower than the surface of the first layer; and
  a second layer having a first part and a second part, wherein the first part is affixed to the pad to provide an electrical signal to the line and the second part is affixed to the opening defined in the first layer to enhance adhesion between the first and second layers.

2. The flat panel display device of claim 1, wherein the first part of the second layer is a conductive portion and the second part is an insulating portion.

3. The flat panel display device of claim 1, further including a third layer disposed between the second layer and the first layer, wherein the third layer affixes the first part to the pad and the second part to the substrate through the at least one opening defined in the first layer.

4. The flat panel display device of claim 2, further including a third layer disposed between the second layer and the first layer, wherein the third layer affixes the conductive portion to the pad and the insulating portion to the substrate through the at least one opening defined in the first layer.

5. The flat panel display device of claim 2, wherein the second layer is a tape carrier package.

6. The flat panel display device of claim 3, wherein the third layer is an anisotropic conductive film.

7. The flat panel display device of claim 1, wherein the at least one opening defined in the first layer extends to the substrate.

8. The flat panel display panel of claim 1, wherein the first layer defines a plurality of openings for securing the second layer with the first layer.

9. The flat panel display panel of claim 1, wherein the first layer is an insulating layer.

10. An active panel of a liquid crystal display device comprising:
  a substrate;
  a gate line formed on the substrate;
  a gate pad formed at the end of the gate line;
  a gate insulating layer covering the gate line and the gate pad;
  a source line crossing the gate line on the gate insulating layer;
  a source pad formed at the end of the source line;
  a passivation layer covering the source line and the source pad;
  a gate contact hole exposing the gate pad;
  a source contact hole exposing the source pad, wherein the passivation layer defines at least one hole exposing at least a portion of the substrate between the gate pad and the source pad.

11. The active panel of claim 10, further comprising:
  a gate electrode derived from the gate line;
  a semiconductor layer formed on the gate insulating layer over the gate electrode;
  a source electrode derived from the source line and making ohmic contact with a first part of the semiconductor layer;
  a drain electrode making ohmic contact with a second part of the semiconductor layer;
  a drain contact hole exposing the drain electrode;
  a gate pad terminal connected to the gate pad through the gate contact hole;
  a source pad terminal connected to the source pad through the source contact hole;
  a pixel electrode connected to the drain electrode through the drain contact hole; and
  a connector including a conductive pad connected to the gate pad and the source pad and an insulating film affixed to the at least a portion of the substrate exposed through the hole.

12. A display device comprising:

a substrate;

first and second gate lines over the substrate;

first and second source lines over the gate lines;

first and second gate pads connected to the first and second gate lines, respectively;

first and second source pads connected to the first and second source lines, respectively; and an insulating layer over the gate lines and the source lines, the insulating layer having a first hole between the first and second gate pads and a second hole between the first and second source pads.

13. The display device according to claim 12, wherein the display device is a liquid crystal display device.

14. The display device according to claim 12, wherein the insulating layer has a plurality of holes between the first and second gate pads.

15. The display device according to claim 12, wherein the insulating layer has a plurality of holes between the first and second source pads.

16. The display device according to claim 12, wherein the first hole is elongated in the direction between the first and second gate pads.

17. The display device according to claim 12, wherein the second hole is elongated in the direction between the first and second source pads.

18. The display device according to claim 12, further comprising a tape carrier package having first and second parts.

19. The display device according to claim 18, wherein the first part is affixed to at least one of the gate pads and the source pads and the second part is affixed to the substrate through at least one of the first and second holes in the insulating layer.

20. The display device according to claim 18, further comprising an anisotropic conductive film between the tape carrier package and the insulating layer.

21. The display device according to claim 12, further comprising a thin film transistor adjacent a crossing point of the first gate line and the first source line.

* * * * *